United States Patent
Garg et al.

(10) Patent No.: US 8,051,076 B1
(45) Date of Patent: Nov. 1, 2011

(54) DEMOTION OF REPETITIVE SEARCH RESULTS

(75) Inventors: Ashutosh Garg, Sunnyvale, CA (US); Kedar Dhamdhere, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 496 days.

(21) Appl. No.: 11/955,975

(22) Filed: Dec. 13, 2007

(51) Int. Cl.
*G06F 17/30* (2006.01)

(52) U.S. Cl. ...................................................... 707/723

(58) Field of Classification Search .................. 707/705, 707/722–735
See application file for complete search history.

(56) References Cited

U.S. PATENT DOCUMENTS

| | | | |
|---|---|---|---|
| 6,285,999 B1 | 9/2001 | Page | |
| 6,381,594 B1 * | 4/2002 | Eichstaedt et al. | 1/1 |
| 6,487,553 B1 * | 11/2002 | Emens et al. | 1/1 |
| 6,571,238 B1 * | 5/2003 | Pollack et al. | 1/1 |
| 6,795,820 B2 * | 9/2004 | Barnett | 1/1 |
| 7,406,465 B2 * | 7/2008 | Jones et al. | 1/1 |
| 7,444,327 B2 * | 10/2008 | Watson et al. | 1/1 |
| 7,451,142 B2 * | 11/2008 | Arellanes et al. | 1/1 |
| 7,571,157 B2 * | 8/2009 | Chowdhury et al. | 1/1 |
| 7,617,193 B2 * | 11/2009 | Bitan et al. | 1/1 |
| 7,653,618 B2 * | 1/2010 | Andreev et al. | 1/1 |
| 7,698,331 B2 * | 4/2010 | Carson et al. | 707/728 |
| 7,725,464 B2 * | 5/2010 | Grubb et al. | 707/723 |
| 2005/0080771 A1 * | 4/2005 | Fish | 707/3 |
| 2005/0154718 A1 * | 7/2005 | Payne et al. | 707/3 |
| 2005/0222981 A1 * | 10/2005 | Lawrence et al. | 707/3 |
| 2008/0005118 A1 * | 1/2008 | Shakib et al. | 707/10 |

OTHER PUBLICATIONS

Brin, S. and Page, L., "The Anatomy of a Large-Scale Hypertextual Web Search Engine" [online], [retrieved on Oct. 27, 2010]. Retrieved from the Internet: http://infolab.stanford.edu/pub/papers/google.pdf, 20 pages.

* cited by examiner

*Primary Examiner* — Tim T Vo
*Assistant Examiner* — Michelle Owyang
(74) *Attorney, Agent, or Firm* — Fish & Richardson P.C.

(57) ABSTRACT

Apparatus, systems and methods for demoting repetitive search results are disclosed. Search results that are identified in both first set of search results and a second set of search results are determined to be repetitive search results. One or more of the repetitive search results can be demoted in the second set of search results. The demotion can be based on a relevancy threshold for the second set of search results.

31 Claims, 9 Drawing Sheets

| # | SEARCH RESULT | QUERYB KEYWORDS |
|---|---|---|
| 1 | Search Result 552 | keywordB |
| 2 | Search Result 554 | keywordB, keywordB', keywordB" |
| 3 | Search Result 556 | keywordB |
| 4 | Search Result 558 | keywordB, keywordB' |
| 5 | Search Result 560 | keywordB |
| 6 | Search Result 562 | keywordB |
| 7 | Search Result 564 | keywordB' |
| 8 | Search Result 566 | keywordB |
| 9 | Search Result 568 | keywordB', keywordB" |
| 10 | Search Result 570 | keywordB" |

FIG. 5b

DEMOTION OF REPETITIVE SEARCH RESULTS

BACKGROUND

This document relates to processing repetitive search results.

The rise of the Internet has enabled access to a wide variety of content items, e.g., video and/or audio files, web pages for particular subjects, news articles, etc. Content items of particular interest to a user can be identified by a search engine in response to a user query. One example search engine is the Google search engine provided by Google Inc. of Mountain View, Calif., U.S.A. The query can include one or more search terms or phrases, and the search engine can identify and rank the content items based on the search terms or phrases in the query. The search engine can present the identified and ranked content items to the user.

Often a user may not find a suitable content item that was identified in response to the user's query and which satisfies the user's interests. Thus, the user may submit multiple queries to the search engine during a search session. Because the user's queries are often related, the same search results are often identified in response to similar queries during the same session. For example, a query for "black jacket" may be immediately followed by a query for "black coat." Both a queries may return a result for the same online winter coat stores, e.g. Winter Coats Online. However, if the user is not interested in the online winter coat store "Winter Coats Online," prominent presentation of the repetitive search result in response to the second and subsequent queries may degrade the user's experience.

SUMMARY

In general, one aspect of the subject matter disclosed in this specification can be embodied in a method for demoting repetitive search results. A first set of search results responsive to a first query during a search session is identified. Each search result of the first set of search results has a corresponding relevancy score and the search results are ranked according to relevancy score. A second set of search results responsive to a second query during the search session is identified. Each search result of the second set of search results has a corresponding relevancy score and the search results are ranked according to relevancy score. One or more repetitive search results are identified, wherein each of the one or more repetitive search results is a search result in both the first set of search results and the second set of search results. A relevancy threshold for the second set of search results is determined. The repetitive search results that have a relevancy score in the second set of search results greater than the relevancy threshold are candidates for demotion. One or more of the candidates for demotion are demoted so that the demoted search results are ranked below the relevancy threshold. Other embodiments of this aspect include corresponding systems, apparatus, and computer program products.

Various optional advantages and features can include selection of a relevancy threshold such that the repetitive search results are not demoted in rank below search results likely to include very little relevant content responsive to the user query. Only the repetitive search results that have been previously selected by the user can be candidates for demotion, or, alternatively, all of the repetitive search results can be candidates for demotion. The relevancy threshold can be determined by a significant change in the relevancy scores of the second set of search results; or by the score of a search result responsive to a machine-optimized search query that is based on the user query; or by identifying a repetitive search result in the second set of search results which was selected by the user when presented in the first set of search results; or by other threshold determination processes.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5b is an example of a relevancy threshold keyword chart.

Like reference numbers and designations in the various drawings indicate like elements.

DETAILED DESCRIPTION

Figure 1:
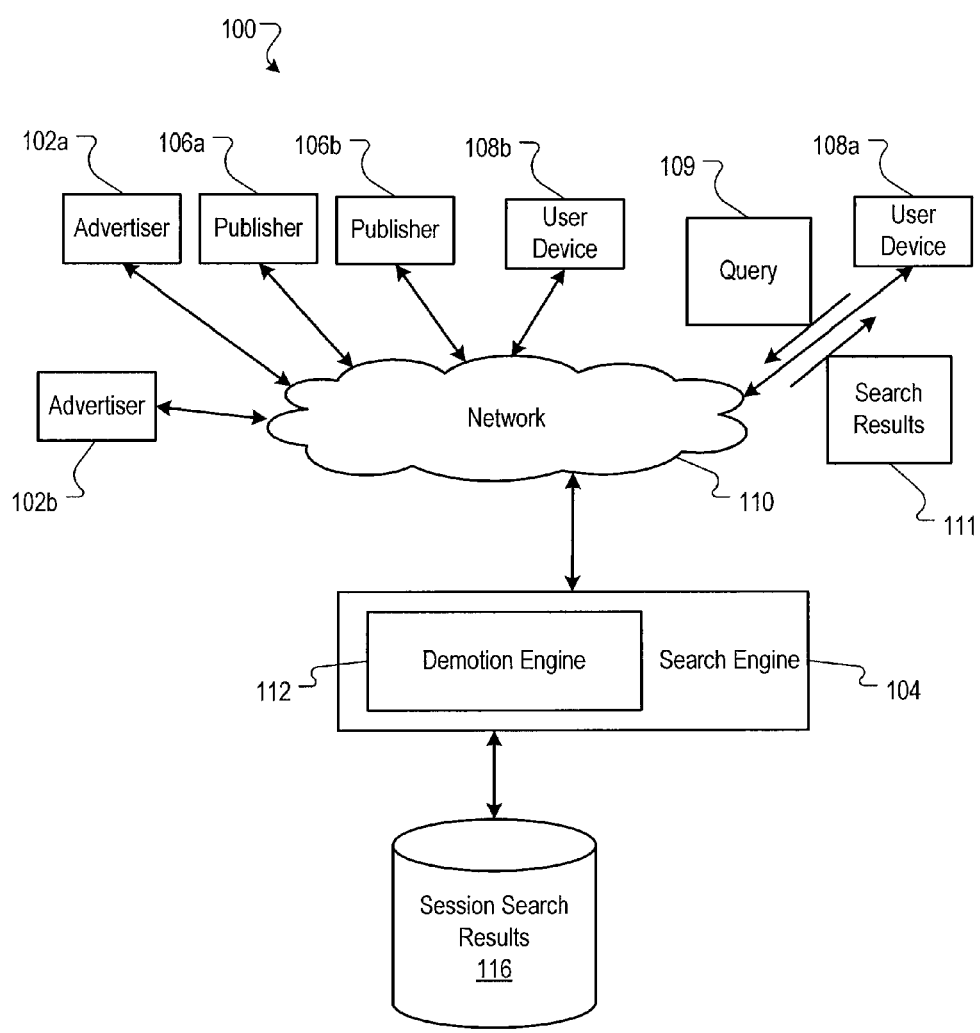
FIG. 1 is a block diagram of an example online environment.

FIG. 1 is a block diagram of an example online environment 100. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102a and 102b, a search engine 104, publishers 106a and 106b, and user devices 108a and 108b. Example user devices 108 include personal computers, mobile communication devices, television set-top boxes, etc. Although only two advertisers (102a and 102b), two publishers (106a and 106b) and two user devices (108a and 108b) are shown, the online environment 100 may include many thousands of advertisers, publishers and user devices.

§1.0 Content Search Processing

The publishers 106a and 106b can include general content servers that receive requests for content (e.g., web pages or documents related to articles, discussion threads, music, video, graphics, other web page listings, information feeds, product reviews, etc.), and retrieve the requested content in response to the request. For example, content servers related to news content providers, retailers, independent blogs social network sites, products for sale, or any other entity that provides content over the network 110 can be a publisher.

A user device, such as user device 108a, can submit a query 109 to the search engine 104, and search results 111 can be provided to the user device 108a in response to the query 109. The search results 111 can include a link to web pages provided by the publishers 106a and 106b.

To facilitate identification of the search results responsive to queries, the search engine 104 can index the content provided by the publishers 106 (e.g., an index of web pages) for later search and retrieval of search results that are relevant to the queries. An exemplary search engine 104 is described in S. Brin and L. Page, "The Anatomy of a Large-Scale Hypertextual Search Engine," Seventh International World Wide Web Conference, Brisbane, Australia (1998) and in U.S. Pat. No. 6,285,999. Search results can include, for example, lists of web page titles, snippets of text extracted from those web pages, and hypertext links to those web pages, and may be grouped into a predetermined number of (e.g., ten) search results.

In some implementations, the search engine 104 can derive a relevance score for each search result and rank the search results 111 according to the relevance scores. In some implementations, the relevance scores can be based on an information retrieval (IR) score that measures the relevance of a query to the web page documents. The IR scores can be computed from, for example, dot products of feature vectors corresponding to the query and document content of a web page.

In some implementations, the IR scores can be combined with other data related to the web pages to generate the relevancy scores. For example, page rank scores of the web pages, e.g., scores associated with the quality of web pages as measured by the number of other sites linking to the web pages, can be combined with the IR scores to generate the relevancy scores. Other algorithms and processes for identifying and ranking search results can also be used.

§1.1 Repetitive Search Results During a Search Session

Often a user may not find a suitable content item identified by the search results that satisfies the user's interests. Thus, the user may submit multiple queries 109 to the search engine 104 during a search session. Because the user's queries 109 are often related during the search session, the same search results 111 are often identified in response to similar queries 109 during the same session. For example, a query for "black jacket" may be immediately followed by a query for "black coat." Both queries may return a result for the same online winter coat store, e.g. Winter Coats Online. However, if the user is not interested in the online winter coat store "Winter Coats Online," prominent presentation of the repetitive search result in response to the second and subsequent queries 109 may degrade the user's experience.

The search engine 104 can store the search results 111 for each query 109 in a search session. In an implementation, the user queries 109 and corresponding search results 111 can be stored in a session search results data store 116. The session search results data store 116 can store a set of ranked search results 111 for each query 109; or can alternatively store crawled web pages that are relevancy ranked for each query 109. Other data structures can also be used to store queries 109 and search results 111 for search sessions.

In some implementations, a search session can be defined by a period of time between queries. For example, if a particular user device 108a enters a query, a current search session can be initiated. The current search session can be terminated when the search engine 104 has not received further queries from the user for a preset period of time (e.g., 5-10 minutes). In other implementations, the search session can be defined by a user indicating the beginning and end of a search session (e.g., by logging into a search engine interface of the search engine 104 and logging out of a search engine interface). In still further implementations, the search session can be defined by a relationship between a newly received search query and previously received search queries from the same user. Other ways of identifying and tracking a search session can also be used.

1.2 Demotion of Repetitive Search Results

In some implementations, the search engine 104 can include a demotion engine 112 that can identify repetitive search results in a subsequent set of search results for a search session and demote some or all of the identified repetitive search results in the subsequent set of search results. Because the repetitive search results are, however, relevant to multiple user queries, it is likely that the repetitive search results include content that may be of interest to the user. For example, a user may provide several queries regarding a particular topic to the search engine 104 during a search session, and several repetitive search results may be presented in response to each query. The user may not initially select the repetitive search results before issuing another query; or, alternatively, may review several of the repetitive search results when presented in response to the first query but may issue additional queries in an attempt to find more relevant information. Accordingly, the repetitive search results may provide relevant information to the user, and thus it is desirable to not demote the repetitive search results to a ranking that is less than the ranking of search results that are determined to be only marginally relevant to a user query.

To ensure proper demotion of the repetitive search results, the demotion engine 112 selects a relevancy threshold such that the repetitive search results are not demoted in rank below search results that are likely to include very little relevant content responsive to the user query. In some implementations, the relevancy threshold can be determined by a significant change in the relevancy scores of the second set of search results. In other implementations, the relevancy threshold can be determined by the score of the search result that is responsive to a machine-optimized search query that is based on the user query. In still other implementations, the relevancy threshold can be determined by identifying a repetitive search result in the second set of search results which was selected by the user when presented in the first set of search results. Still other threshold determination processes can also be used.

The search engine 104 and the demotion engine 112 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The search engine 104 and the demotion engine 112 can be implemented separately, or can be implemented as a single software entity. The search engine 104 and the demotion engine 112 can also be distributively implemented over a network, such as a server farm, or can be implemented in a single computer device.

§2.0 Examples of Demotion of Repetitive Search Results

Figure 2:
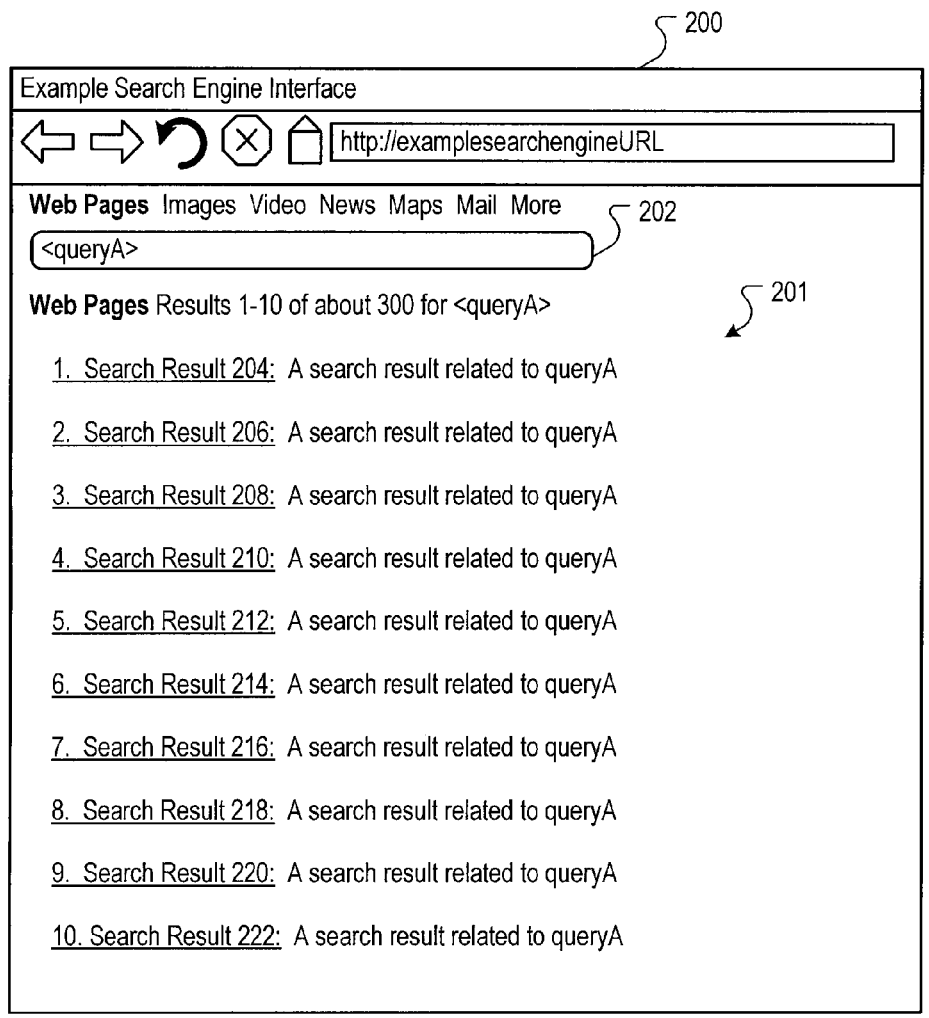
FIG. 2 is an example screen shot of a set of search results.
Figure 3:
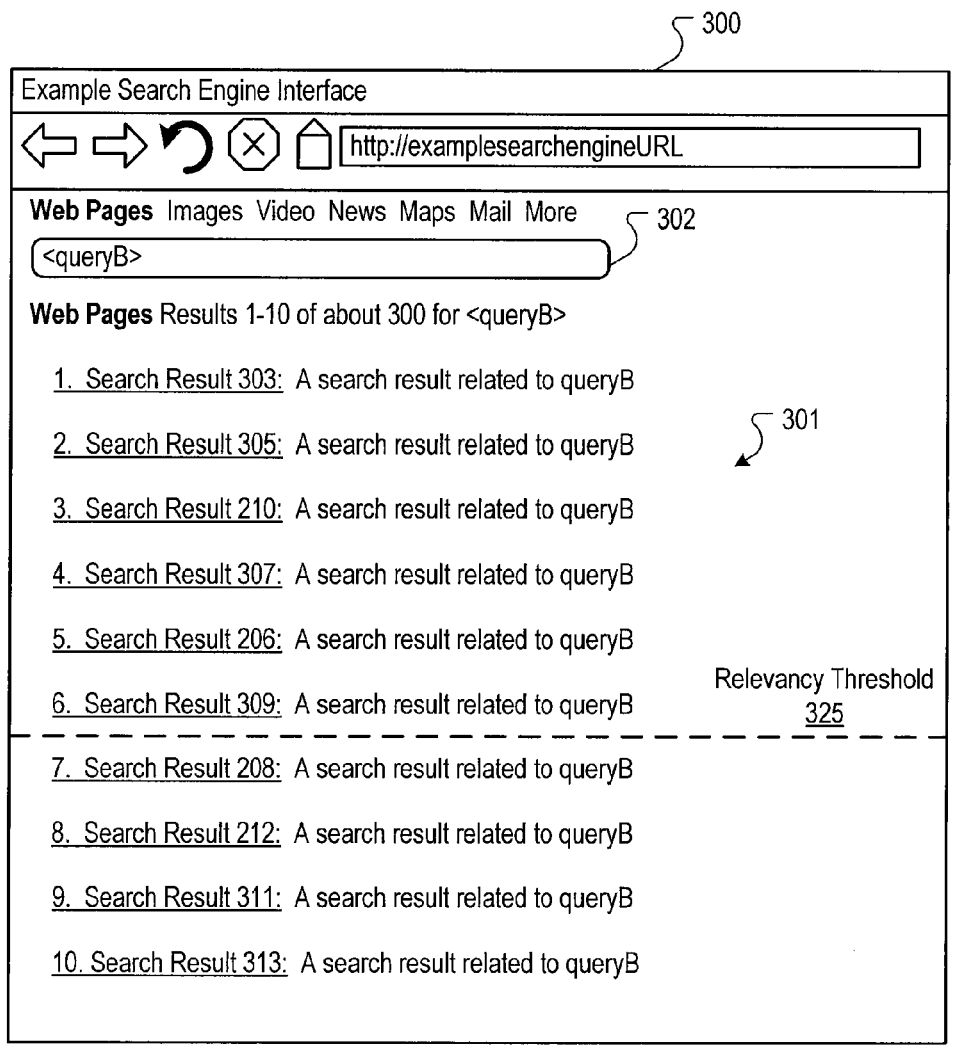
FIG. 3 is another example screen shot of a set of search results.

FIGS. 2-6 are used to illustrate examples of various demotion schemes for demoting repetitive search results based on a relevancy threshold. FIG. 2 is an example screen shot 200 of a set of first search results 201 that are responsive to a first query, e.g., the query "queryA" as listed in the query edit box 202, and FIG. 3 is an example screen shot 300 of a set of second search results 301 that are responsive to a second query, e.g., the query "queryB" as listed in the query edit box 302.

The second set of search results 301 is presented without demotion, i.e., the repetitive search results 206, 208, 210 and 212 are not demoted, and is presented for the purposes of illustrating how the repetitive search results 206, 208 and 210 are demoted according to the various demotion schemes described with reference to FIGS. 4-7.

The sets of search results 201 and 301 can, for example, be a set of search results identified by the search engine 104 of FIG. 1 during a search session. The set of search results 201 are ranked according to a relevancy score in response to the query queryA. The highest ranked search result, e.g. search result 204, has the highest relevancy score in response to queryA. Search results 206 to 222 are subsequently ranked in order of their relevancy scores, e.g., the fourth ranked search result, search result 210, has the fourth highest relevancy score. For example, a user searching for a black winter jacket may submit a query for "black jacket." The online store Black Jackets may have the highest relevancy score in response to a query for "black jacket" and would be the highest ranked search result, i.e., search result 204. Another online store, Winter Coats Online, may have the fourth highest relevancy score and would be the fourth ranked search result, e.g., search result 210.

The set of search results 301 are a set of search results identified by the search engine 104 during the same search session as the search results 201. Similar to the set of search results 201, the set of search results 301 can be ranked according to a relevancy score in response to the query queryB. Although the search results 301 are returned in response to queryB, the search results 301 includes search results 206, 208, 210, and 212 that were previously returned as part of the search results 201 in response to queryA. Thus, the search results 206, 208, 210, and 212 are repetitive search results. If repetitive search results are not demoted, the search results 301 would be presented as shown in FIG. 3.

For example, in the same search session where the user submitted a first query for "black jacket," the user may submit a second query for "black coat." The online store Black Coats may have the highest relevancy in response to a query for "black coat," and would be the highest ranked search result, e.g., search result 303. Additionally, the online store Winter Coats Online may have the third highest relevancy score. When the search engine 104 does not demote repetitive results, Winter Coats Online would remain the third ranked search result even though it was already identified by the previous query in the same search session.

When search results are ranked for presentation according to their relevancy scores, each search result will have a higher relevancy score than the next ranked search result. However, the demotion engine 112 can identify a relevancy threshold 325 in the second set of search results 301. The relevancy threshold 325 can be used for identifying repetitive search results having a relevancy score greater than the relevancy threshold as candidates for demotion.

In some implementations, the demotion engine 112 identifies a relevancy threshold as being between two search results where there is a significant difference in the relevancy of the two search results. In some implementations, the repetitive search results ranked above the relevancy threshold 325 can be demoted so that they are ranked below the relevancy threshold.

Figure 4:
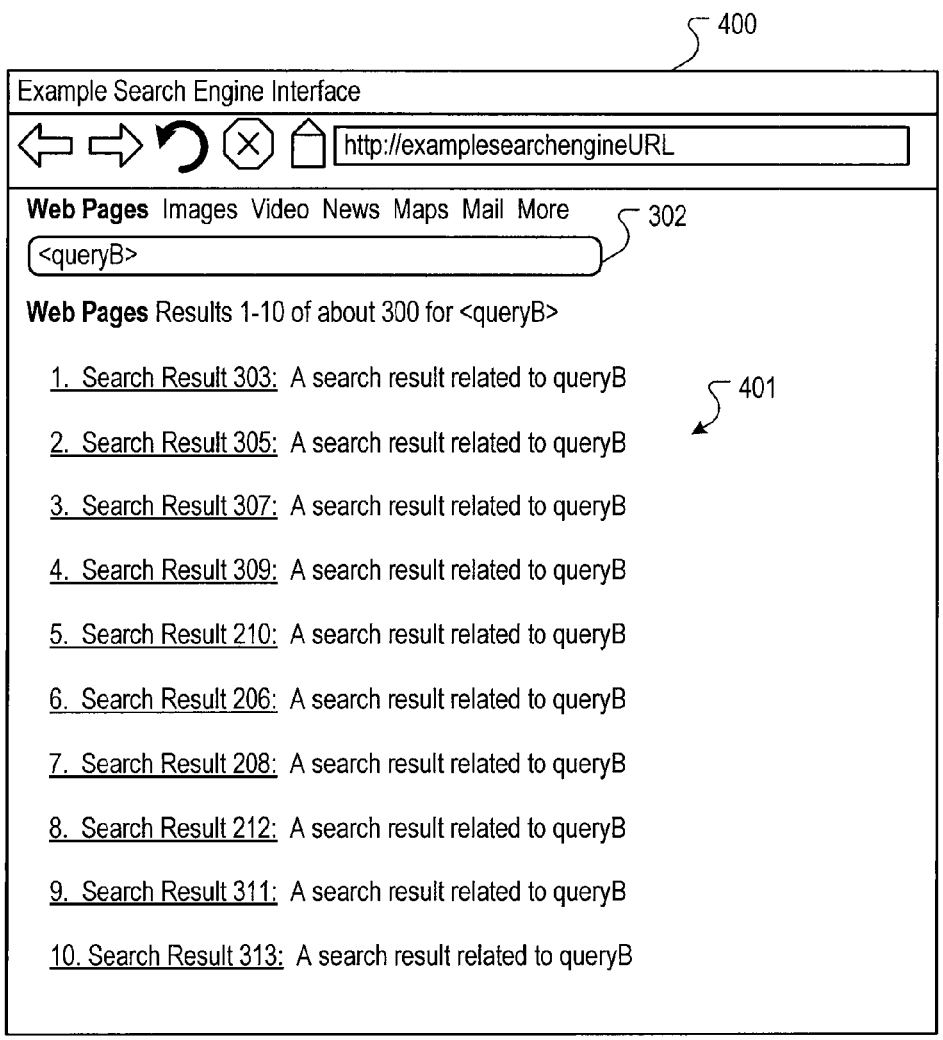
FIG. 4 is another example screen shot of a set of search results.

FIG. 4 is another example screen shot 400 of a set of search results 401. The set of search results 401 can includes the same search results of the set of search results 301; however, the repetitive search results 210 and 206 are demoted below the relevancy threshold 325 of FIG. 3. Thus, even though repetitive search results 210 and 206 may have higher relevancy scores with reference to queryB than the search result 309, the repetitive search results 210 and 206 are demoted below the relevancy threshold 325 because the repetitive results 210 and 206 were already identified in response to the first query for queryA.

For example, the online store New and Used Black Coats may be the sixth ranked search result, e.g., search result 309, returned in response to the query for "black coats." If the relevancy threshold 325 is after New and Used Black Coats, the repetitive search result 210, Winter Coats Online, initially ranked third in FIG. 3, can be demoted in rank so that it appears after the search result 309. Similarly, the repetitive search result 210 ranked fifth in FIG. 3 is also demoted below the search 309. Thus, in the resulting set of search results 401, all repetitive search results that were ranked above the relevancy threshold 325, i.e., search results 206 and 210, are demoted below the relevancy threshold 325.

§2.2 Examples of Relevancy Threshold Determination

Figure 5A:
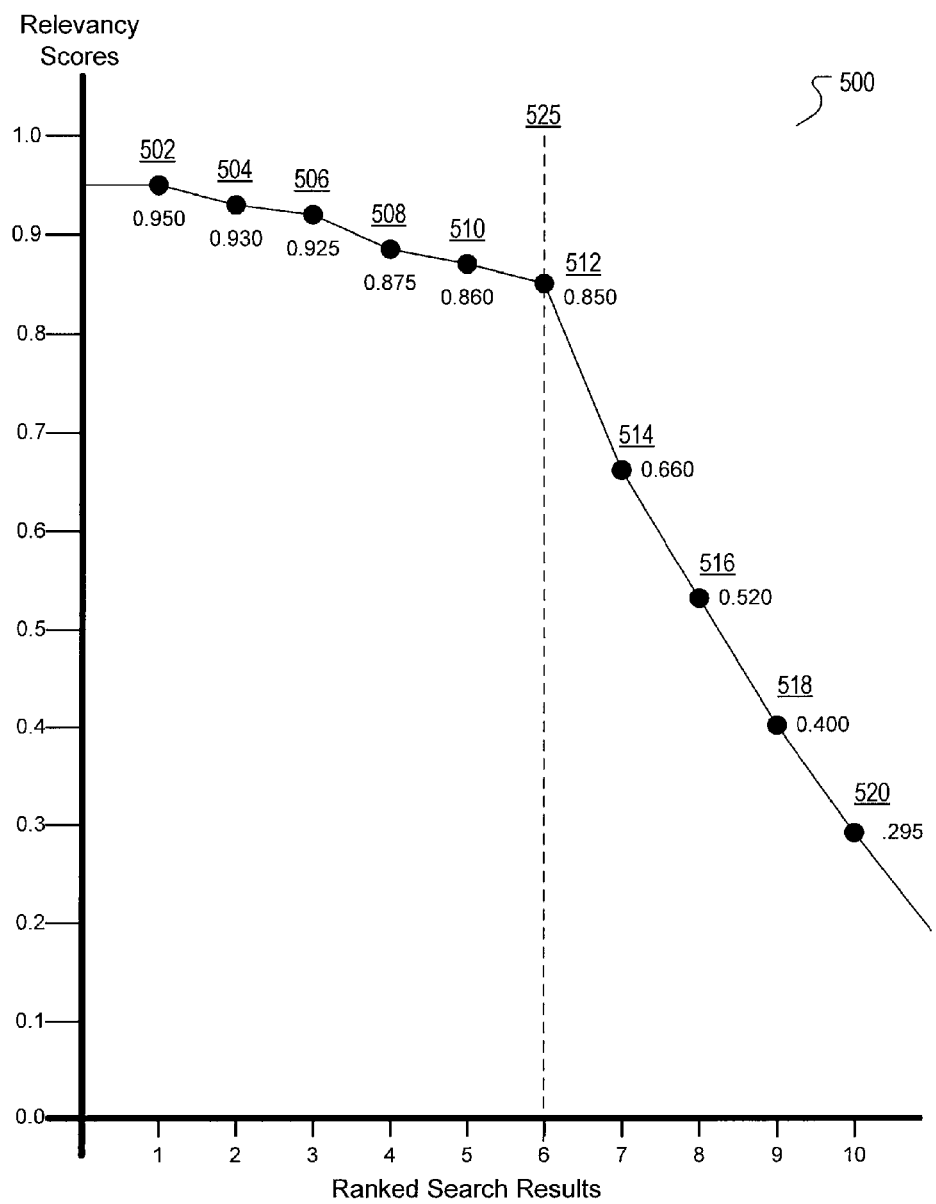
FIG. 5a is an example of a relevancy threshold histogram.

FIG. 5a is an example of a relevancy threshold histogram 500. The histogram 500 represents relevancy scores of the search results returned in response to a query. In some implementations, the demotion engine 112 can identify the decrease in the relevancy scores of two consecutive search results. The difference between two consecutive search results can be measured first from the first and second ranked search results, and then subsequently measured for each subsequent pair of search results, e.g., second and third, third and fourth, etc. If the decrease exceeds a relevancy difference threshold, a relevancy threshold based on the two relevancy scores can be determined. In some implementations, the relevancy score of the highest ranked search result for which the decrease exceeds the relevancy difference measure is the relevancy threshold. In other implementations, the relevancy score of the lowest ranked search result for which the decrease exceeds the relevancy difference measure is the relevancy threshold.

In some implementations, the relevancy difference measure is based on the difference in the relevancy scores of two or more search results. One method of calculating the relevancy difference measure of a search result is a two step calculation. The first step is to calculate the percentage differential in the relevancy scores of two consecutive search results. The second step is to calculate the difference in the percentage differential of two consecutive search results.

For example, the relevancy difference measure at search result 512 is the percentage differential between the relevancy scores of search results 512 and 514:

$$\frac{\text{Search Result } 512 - \text{Search Result } 514}{\text{Search Result } 512} = \frac{0.850 - 0.660}{0.850} = 22.35\%$$

Similarly calculated are the percentage differentials and the changes in percentage differentials between the remaining relevancy scores are shown in Table 1 below:

TABLE 1

Relevancy Percentage Differentials

| Search Result | Percentage Differential | Δ in Percentage Differential |
|---|---|---|
| 502 | 2.11% | — |
| 504 | 0.54% | \|0.54 − 2.11\| = 1.57 |
| 506 | 5.41% | \|5.41 − 0.54\| = 4.87 |
| 508 | 1.71% | \|1.71 − 5.41\| = 3.69 |
| 510 | 1.16% | \|1.16 − 1.71\| = 0.55 |
| 512 | 22.35% | \|22.35 − 1.16\| = 21.19 |
| 514 | 21.21% | \|21.21 − 22.35\| = 1.14 |

TABLE 1-continued

Relevancy Percentage Differentials

| Search Result | Percentage Differential | Δ in Percentage Differential |
|---|---|---|
| 516 | 23.08% | \|23.08 − 21.21\| = 1.86 |
| 518 | 26.25% | \|26.25 − 23.08\| = 3.17 |
| 520 | — | — |

The relevancy difference threshold is a value that quantifies a substantial difference in the relevancy scores of two search results in a set of search results. In some implementations, the relevancy threshold is related to the maximum change in percentage differential between two search results in the first N search results, where N is a predetermined number. From Table 1 above, the maximum change in percentage differential in the first 10 search results is 21.19. Thus, the search result at the substantial decrease is search result 512. The relevancy score of search result 512, 0.850, is thus selected as the relevancy threshold for the set of search results represented in histogram 500.

In some implementations, the relevancy difference threshold is a predetermined percentage, e.g., 10%. In these implementations, the relevance threshold is selected at the first relevancy difference measure that exceeds the predetermined percentage. From Table 1 above, the relevancy score of search result 512, 0.850, is thus selected as the relevancy threshold for the set of search results represented in histogram 500.

Other relevancy threshold selections processes based on relevancy scores can also be used.

Relevancy thresholds can also be selected based on other factors, such as optimized keywords. FIG. 5*b* is an example of a relevancy threshold keyword table 550. The keyword table 550 identifies the keywords related to the search results returned in response to a query. In some implementations, the demotion engine 112 can select a relevancy threshold based on a search result that is responsive to an optimized keyword.

For example, the search engine 104 returns search results that are related to an optimized query in addition to the original keywords. An optimized query is a query that is automatically generated by the search engine 104 in response to a user query, and can include variations of the user query that are commonly searched, e.g. the plural form of one of the query terms, an alternate spelling of a query term, etc. Identifying search results that are returned in response to an optimized query rather than the original query is another method of calculating the relevancy threshold. In some implementations, the relevancy score of the first search result returned only in response to the optimized query is the relevancy threshold.

For example, where queryB is a query for "black coat," search results 552-562, and search result 566 were all returned in response to the query for "black coat." However, the search result 564 was not returned in response to the original query for "black coat," but rather because the search result 564 is responsive to the optimized query keywordB', e.g., "black coats." Search results 568 and 570 are also not returned in response to the query term keywordB, but instead are return in response to optimized queries keywordB' and keywordB". Because the search result 564 is the highest ranked search result returned in response only to the optimized keyword, however, the relevancy threshold is calculated based on the search result 564. In some implementations, the relevancy threshold 575 can be the relevancy score of search result 564.

The relevancy thresholds identified in the histogram 500 and the keyword chart 550 are selected for a second or subsequent set of search results in a search session, and are illustratively determined based only on the second set of search results. In particular, the relevancy threshold in the histogram 500 was the relevancy score of the search result at the substantial decrease in relevancy scores in the second set of search results, e.g. the search result 512, and the relevancy threshold in the keyword chart 550 was the relevancy score of the search result at the first search result returned in the second set of search results only in response to the optimized query, e.g. the search result 564.

Figure 6:
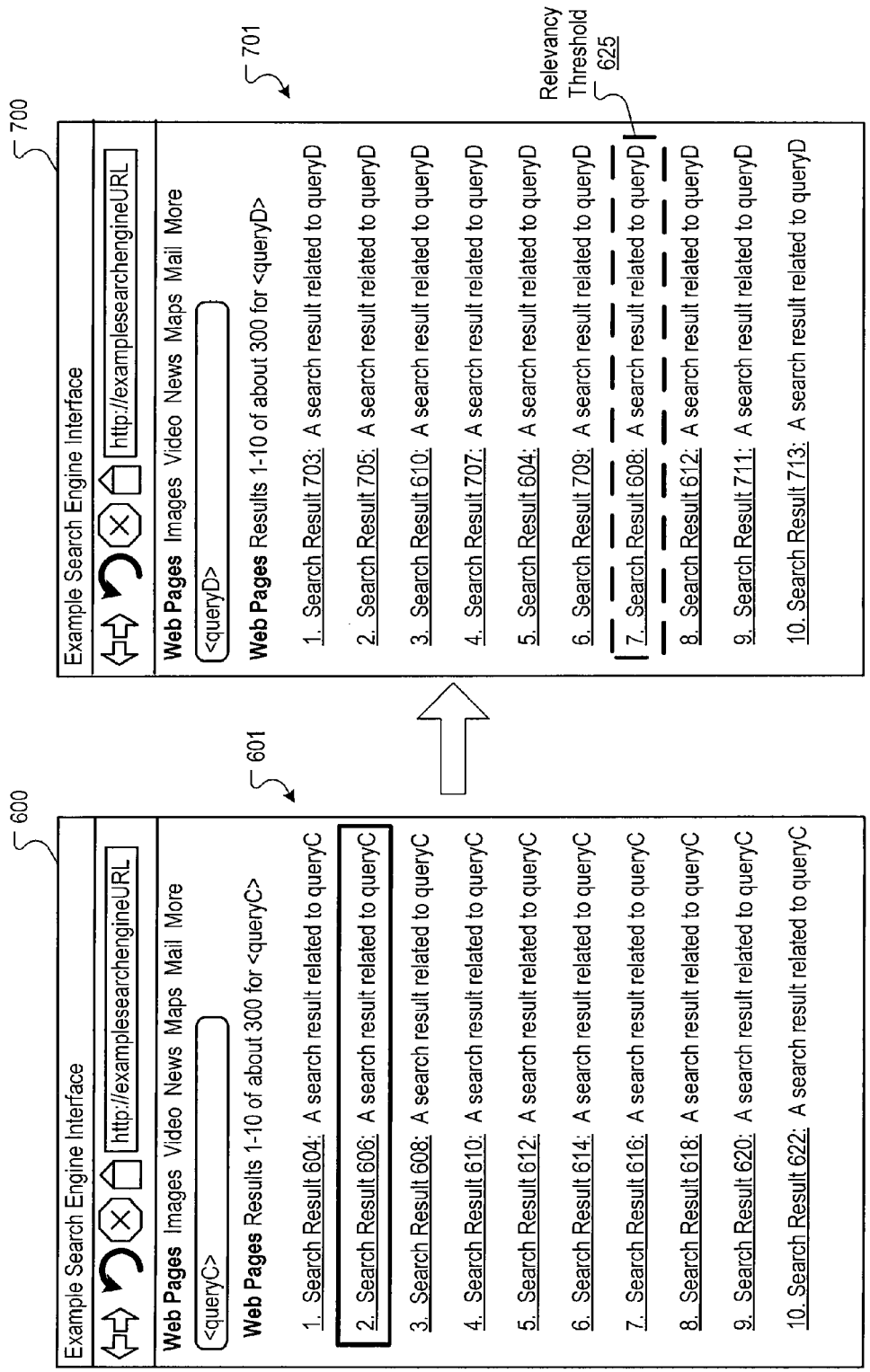
FIG. 6 illustrates example screen shots of search results for determining a last-clicked relevancy threshold.

In some implementations, however, the relevancy threshold for a second set of search results can be determined based on both the first and second set of search results. FIG. 6 illustrates example screen shots 600 and 700 of search results 601 and 701 for determining a last-clicked relevancy threshold. The search results 601 and 701 are utilized by the demotion engine 112 in a process to determine a relevancy threshold for the second set of search results 701.

In some implementations, the lowest ranked search result that is selected during the presentation of the first set is identified in the first set of search results. The lowest ranked search result selected can be used to identify a threshold repetitive search result in the first set of search results. The threshold repetitive search result is the highest ranked repetitive search result from the first set of search results that is ranked lower than the lowest ranked search result selected. For example, the search result 606 is the lowest ranked search result clicked in response to queryA. Because search result 608 is a repetitive search result in the search results 700 and is ranked lower than the search result 606, the demotion engine 112 selects the search result 608 as the threshold repetitive search result.

The relevancy threshold 625 in the second set of search results can then be determined based on the relevancy score of the threshold repetitive search result in the second set of search results. For example, relevancy threshold 625 is the relevancy score of the threshold repetitive search result, e.g. search result 608.

In some implementations, the demotion engine 112 also identifies the candidates for demotion in the second set of search results. In these implementations, the candidates for demotion are the repetitive search results that are ranked above the relevancy threshold 625 in the second set of search results 701 and which were ranked above the lowest ranked selected search result in the first set of search results 601. Thus, in the second set of search results 701, only the search result 604 is a candidate for demotion because it is the only search result ranked above the relevancy threshold 625 and that was ranked above the threshold repetitive search result 608 in the first set of search results 601.

Only demoting the search result 604 is based on the interpretation of the selection of the search result 606 in the first set of search results 601 as a signal that the user has reviewed the selected search result 606 and all higher-ranked search results, e.g., search result 604. Likewise, the signal is also indicative that lower ranked search results in the first set of search results, e.g., search results 608-622, were not reviewed by the user. Accordingly, only the search results 604 and 606, if repetitive in the second set of search results 701, would be demoted.

Figure 7:
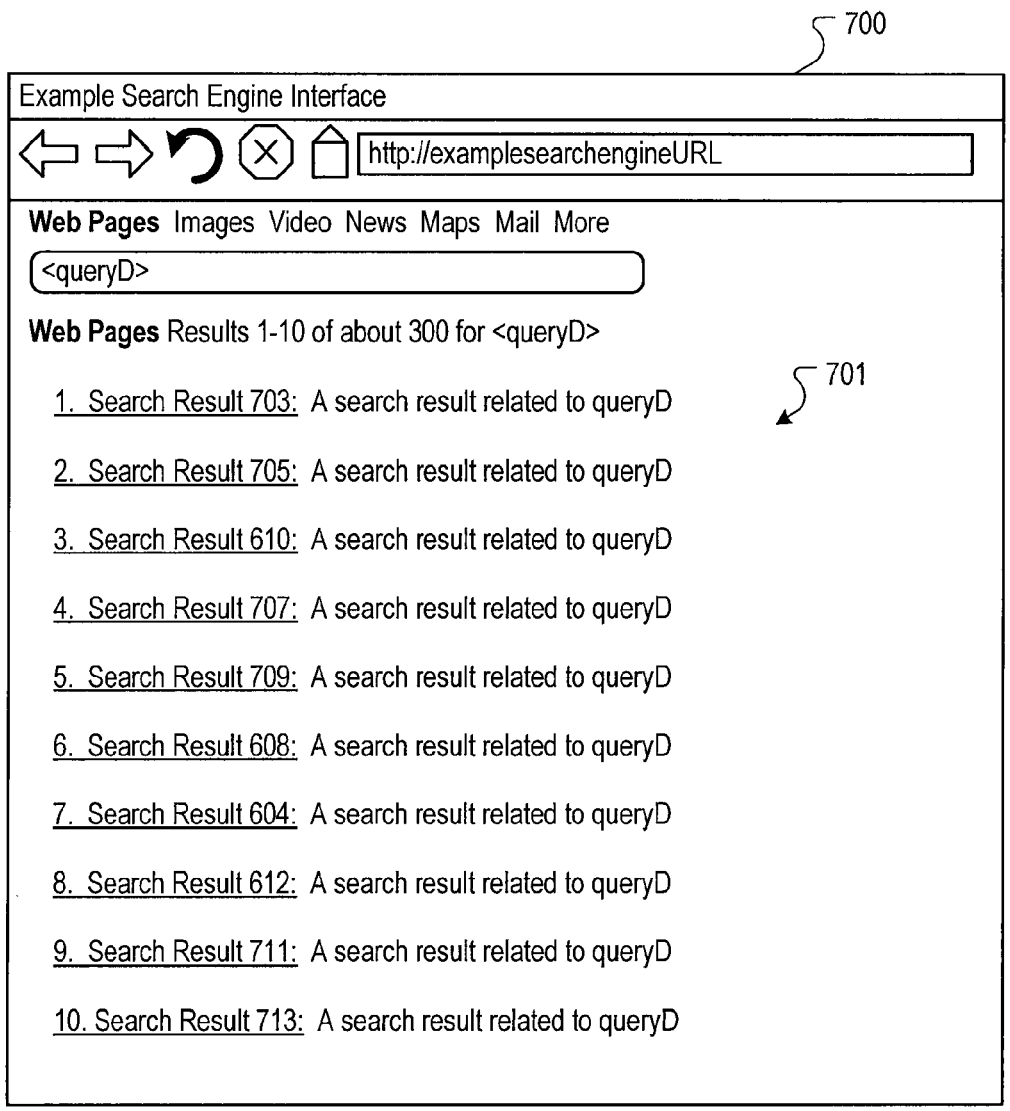
FIG. 7 is another example screen shot of a set of search results.

FIG. 7 is another example screen shot 700 of the second set of search results 701 after demotion of the search result 604. As the only identified candidate for demotion is the search result 604, that search result was demoted below the search result 608. None of the other repetitive search results 608, 610 and 612 are demoted.

§3.0 Example Demotion Process Flow

Figure 8:
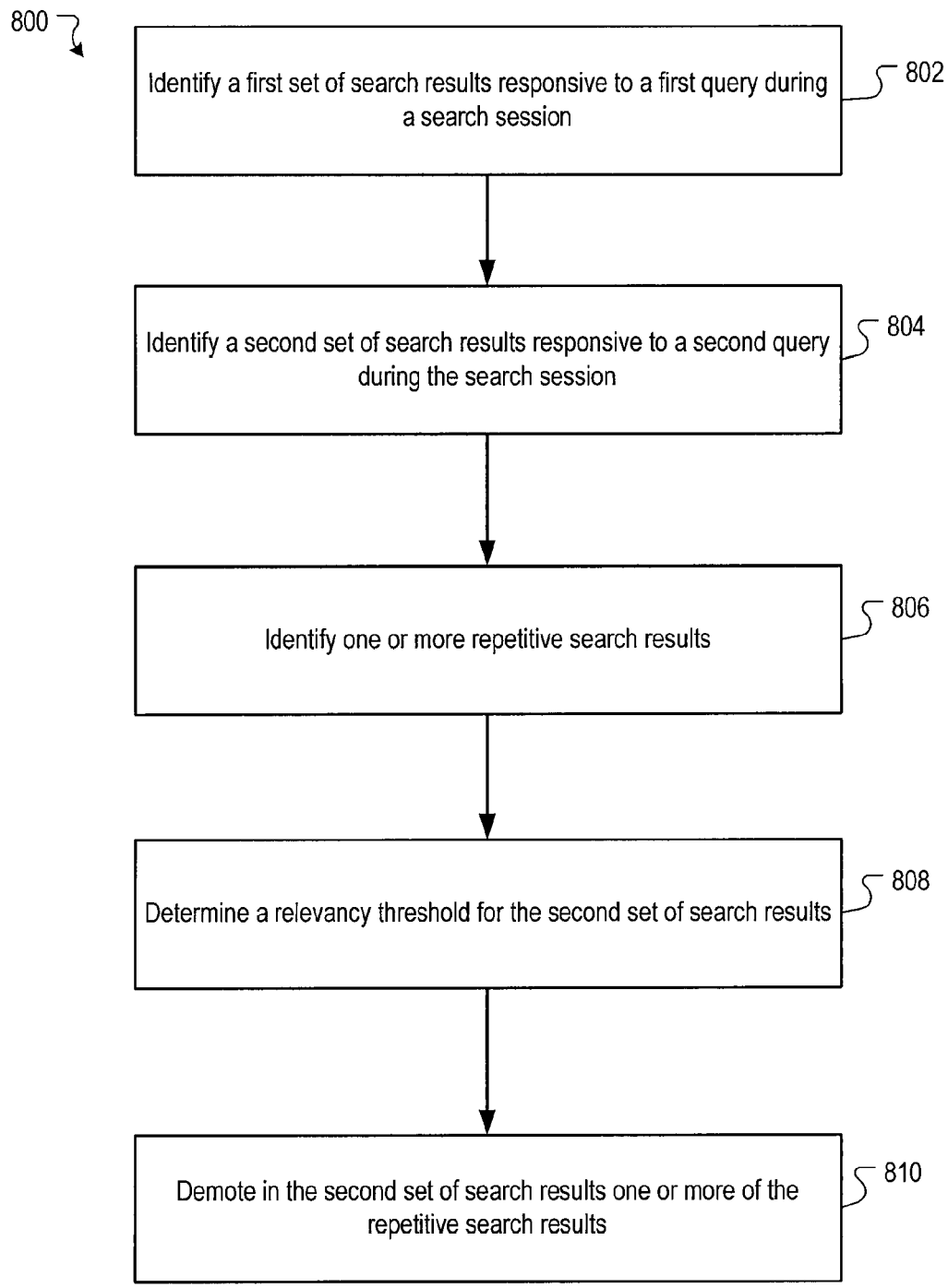
FIG. 8 is a flow diagram of a repetitive search result demotion process.

FIG. 8 is a flow diagram of a repetitive search result demotion process 800. The process 800 can, for example, be implemented in the search engine 104 of FIG. 1 and/or bin the demotion engine 112 of the search engine 104.

The process 800 identifies a first set of search results responsive to a first query during a search session (802). For example, the search engine 104 of FIG. 1 and/or the demotion engine 112 of the search engine 104 can identify a first set of search results responsive to a first query for "black jackets." Included in the search results are the online stores Black Jackets Store 1, Winter Coats Online, Black Jackets Store 2, and Black Jackets Store 3.

The process 800 identifies a second set of search results responsive to a second query during the search session (804). For example, the search engine 104 of FIG. 1 and/or the demotion engine of the search engine 104 can identify a second set of search results responsive to a second query for "black coats." Included in the search results are the online stores Black Coats Store 1, Winter Coats Online, Black Coats Store 2, and Black Coats Store 3.

The process 800 identifies one or more repetitive search results (806). For example, the search engine 104 of FIG. 1 and/or the demotion engine of the search engine 104 can identify the search results identified in response to both the query for "black jackets" and the query for "black coats." Included in the repetitive search results would be the online store Winter Coats Online, because it is found in both sets of search results.

The process 800 determines a relevancy threshold for the second set of search results (808). For example, the search engine 104 of FIG. 1 and/or the demotion engine of the search engine 104 can determine the relevancy threshold for the second set of search results in response to the second query for "black coats." In some implementations, the relevancy threshold for the second set of search results is determined by identifying the maximum decrease in the percentage differentials of the relevancy scores of the second set of search results. For example, if the maximum decrease in the percentage differentials of the relevancy scores occurs between the relevancy scores of Black Coats Store 2 and Black Coats Store 3, the relevancy threshold for the second set of search results is the relevancy score of Black Coats Store 3. The relevancy threshold can also be determined by the other processes described in Section 2 above.

The process 800 demotes in the second set of search results one or more of the repetitive search results (810). For example, the search engine 104 of FIG. 1 and/or the demotion engine 112 of the search engine 104 can demote the repetitive search result for the online store Winter Coats Online. The search result for Winter Coats Online would be demoted below the relevancy threshold, which was the relevancy score for Black Coats Store 2. Accordingly, the rankings of the search results would be Black Coats Store 1, Black Coats Store 2, Winter Coats Online, and then Black Coats Store 3.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method for demoting search results, comprising:
   identifying a first set of search results responsive to a first query during a search session, each search result of the first set of search results having a corresponding relevancy score, and the first set of search results being ranked according to relevancy scores;
   identifying a second set of search results responsive to a second query during the search session, each search result of the second set of search results having a corresponding relevancy score, and the second set of search results being ranked according to relevancy scores, wherein the second query is different from the first query;
   identifying one or more repetitive search results, each of the one or more repetitive search results being a search result in both the first set of search results and the second set of search results;
   determining a relevancy threshold for the second set of search results;
   identifying one or more candidate search results, candidate search results being repetitive search results that have a relevancy score greater than the relevancy threshold, the candidate search results comprising a first candidate search result, the first candidate search result having a ranking in the second set of search results according to relevancy scores;
   demoting the first candidate search result in the second set of search results by lowering the ranking of the first candidate search result in the second set of search results; and
   after demoting the first candidate search result in the second set of search results, providing the second set of search results in a response to the second query;
   wherein the identifying, determining, demoting and providing are performed by data processing apparatus.

2. The method of claim 1, wherein determining a relevancy threshold comprises:
   determining whether a relevancy difference measure based on the relevancy scores of two or more search results of the second set of search results equals or exceeds a relevancy difference threshold;
   identifying a highest relevancy score of the relevancy scores of the two or more search results for which the relevancy difference measure equals or exceeds the relevancy difference threshold; and
   setting the relevancy threshold to a value that is based on the highest relevancy score.

3. The method of claim 2, wherein setting the relevancy threshold to a value that is based on the highest relevancy score comprises setting the relevancy threshold equal to or less than the highest relevancy score.

4. The method of claim 2, wherein the relevancy difference threshold is a maximum change in percentage differential between two or more relevancy scores.

5. The method of claim 1, further comprising:
   identifying a search result ranked at the relevancy threshold; and
   lowering the ranking of the first candidate search result to a ranking lower than the ranking of the search result ranked at the relevancy threshold.

6. The method of claim 1, wherein determining a relevancy threshold comprises:
   identifying a relevancy score of a highest ranked search result responsive to an optimized second query in the second set of search results, wherein the optimized second query includes keywords derived from the keywords included in the second query; and
   setting the relevancy threshold to a value that is based on the highest relevancy score.

7. The method of claim 6, further comprising:
   identifying a search result ranked at the relevancy threshold; and
   lowering the ranking of the first candidate search result to a ranking lower than the ranking of the search result ranked at the relevancy threshold.

8. The method of claim 1, wherein determining a relevancy threshold comprises:
   identifying a ranking of a lowest selected search result from the first set of search results;
   identifying a threshold repetitive search result from the one or more repetitive search results, wherein the threshold repetitive search result is a highest ranked repetitive search result that is ranked lower than the lowest selected search result in the first set of search results; and
   setting the relevancy threshold to a value that is based on the ranking of the threshold repetitive search result in the second set of search results.

9. The method of claim 8, further comprising:
   identifying a search result ranked at the relevancy threshold; and
   lowering the ranking of the first candidate search result to a ranking lower than the ranking of the search result ranked at the relevancy threshold.

10. The method of claim 1, wherein the search session is defined by queries received from a user device over a time period.

11. The method of claim 1, wherein the search session is defined by queries received from a user device that is logged into a user account.

12. The method of claim 1, further comprising providing the second set of search results in re-ranked order.

13. Software stored in a computer readable storage device and comprising instructions executable by a processing system and that upon such execution cause the processing system to perform operations comprising:
   identifying a first set of search results responsive to a first query during a search session, each search result of the first set of search results having a corresponding relevancy score, and the first set of search results being ranked according to relevancy scores;
   identifying a second set of search results responsive to a second query during the search session, each search result of the second set of search results having a corresponding relevancy score, and the second set of search results being ranked according to relevancy scores, wherein the second query is different from the first query;
   identifying one or more repetitive search results, each of the one or more repetitive search results being a search result in both the first set of search results and the second set of search results;
   determining a relevancy threshold for the second set of search results;
   identifying one or more candidate search results, candidate search results being repetitive search results that have a relevancy score greater than the relevancy threshold, the candidate search results comprising a first candidate search result, the first candidate search result having a ranking in the second set of search results according to relevancy scores;
   demoting the first candidate search result in the second set of search results by lowering the ranking of the first candidate search result in the second set of search results; and
   after demoting the first candidate search result in the second set of search results, providing the second set of search results in a response to the second query.

14. The software of claim 13, comprising further instructions executable by the processing system and that upon such execution cause the processing system to perform operations comprising:
   determining whether a relevancy difference measure based on the relevancy scores of two or more search results of the second set of search results equals or exceeds a relevancy difference threshold;
   identifying a highest relevancy score of the relevancy scores of the two or more search results for which the relevancy difference measure equals or exceeds the relevancy difference threshold; and
   setting the relevancy threshold to a value that is based on the highest relevancy score.

15. The software of claim 13, comprising further instructions executable by the processing system and that upon such execution cause the processing system to perform operations comprising:
   identifying a search result ranked at the relevancy threshold; and
   lowering the ranking of the first candidate search result to a ranking lower than the ranking of the search result ranked at the relevancy threshold.

16. The software of claim 13, comprising further instructions executable by the processing system and that upon such execution cause the processing system to perform operations comprising:
   identifying a relevancy score of a highest ranked search result responsive to an optimized second query in the second set of search results, wherein the optimized second query includes keywords derived from the keywords included in the second query; and
   setting the relevancy threshold to a value that is based on the highest relevancy score.

17. The software of claim 13, comprising further instructions executable by the processing system and that upon such execution cause the processing system to perform operations comprising:
   identifying a ranking of a lowest selected search result from the first set of search results;
   identifying a threshold repetitive search result from the one or more repetitive search results, wherein the threshold repetitive search result is a highest ranked repetitive search result that is ranked lower than the lowest selected search result in the first set of search results; and
   setting the relevancy threshold to a value that is based on the ranking of the threshold repetitive search result in the second set of search results.

18. The software of claim 13, comprising further instructions executable by the processing system and that upon such execution cause the processing system to perform operations comprising providing the second set of search results in re-ranked order.

19. A system comprising:
   means for determining a relevancy threshold for a set of search results to be provided in response to a query; and means for demoting a repetitive search result in the set of search results below the relevancy threshold of the set of search results, the repetitive search result remaining in the set of search results to be provided in response to the query.

20. A system comprising:
one or more computers and one or more storage devices storing instructions that are operable, when executed by the one or more computers, to cause the one or more computers to perform operations comprising:
identifying a first set of search results responsive to a first query during a search session, each search result of the first set of search results having a corresponding relevancy score, and the first set of search results being ranked according to relevancy scores;
identifying a second set of search results responsive to a second query during the search session, each search result of the second set of search results having a corresponding relevancy score, and the second set of search results being ranked according to relevancy scores, wherein the second query is different from the first query;
identifying one or more repetitive search results, each of the one or more repetitive search results being a search result in both the first set of search results and the second set of search results;
determining a relevancy threshold for the second set of search results;
identifying one or more candidate search results, candidate search results being repetitive search results that have a relevancy score greater than the relevancy threshold, the candidate search results comprising a first candidate search result, the first candidate search result having a ranking in the second set of search results according to relevancy scores; and
demoting the first candidate search result in the second set of search results by lowering the ranking of the first candidate search result in the second set of search results; and
after demoting the first candidate search result in the second set of search results, providing the second set of search results in a response to the second query.

21. The system of claim 20, wherein determining a relevancy threshold comprises:
determining whether a relevancy difference measure based on the relevancy scores of two or more search results of the second set of search results equals or exceeds a relevancy difference threshold;
identifying a highest relevancy score of the relevancy scores of the two or more search results for which the relevancy difference measure equals or exceeds the relevancy difference threshold; and
setting the relevancy threshold to a value that is based on the highest relevancy score.

22. The system of claim 21, wherein setting the relevancy threshold to a value that is based on the highest relevancy score comprises setting the relevancy threshold equal to or less than the highest relevancy score.

23. The system of claim 21, wherein the relevancy difference threshold is a maximum change in percentage differential between two or more relevancy scores.

24. The system of claim 20, wherein demoting the first candidate search result in the second set of search results comprises:
identifying a search result ranked at the relevancy threshold; and
lowering the ranking of the first candidate search result to a ranking lower than the ranking of the search result ranked at the relevancy threshold.

25. The system of claim 20, wherein determining a relevancy threshold comprises:
identifying a relevancy score of a highest ranked search result responsive to an optimized second query in the second set of search results, wherein the optimized second query includes keywords derived from the keywords included in the second query; and
setting the relevancy threshold to a value that is based on the highest relevancy score.

26. The system of claim 25, wherein demoting the first candidate search result in the second set of search results comprises:
identifying a search result ranked at the relevancy threshold; and
lowering the ranking of the first candidate search result to a ranking lower than the ranking of the search result ranked at the relevancy threshold.

27. The system of claim 20, wherein determining a relevancy threshold comprises:
identifying a ranking of a lowest selected search result from the first set of search results;
identifying a threshold repetitive search result from the one or more repetitive search results, wherein the threshold repetitive search result is a highest ranked repetitive search result that is ranked lower than the lowest selected search result in the first set of search results; and
setting the relevancy threshold to a value that is based on the ranking of the threshold repetitive search result in the second set of search results.

28. The system of claim 27, wherein demoting the first candidate search result in the second set of search results comprises:
identifying a search result ranked at the relevancy threshold; and
lowering the ranking of the first candidate search result to a ranking lower than the ranking of the search result ranked at the relevancy threshold.

29. The system of claim 20, wherein the search session is defined by queries received from a user device over a time period.

30. The system of claim 20, wherein the search session is defined by queries received from a user device that is logged into a user account.

31. The system of claim 20, wherein the operations further comprise providing the second set of search results in re-ranked order.

* * * * *

UNITED STATES PATENT AND TRADEMARK OFFICE
CERTIFICATE OF CORRECTION

| | | |
|---|---|---|
| PATENT NO. | : 8,051,076 B1 | Page 1 of 1 |
| APPLICATION NO. | : 11/955975 | |
| DATED | : November 1, 2011 | |
| INVENTOR(S) | : Ashutosh Garg | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 497 days.

Signed and Sealed this
Twenty-fourth Day of April, 2012

David J. Kappos
*Director of the United States Patent and Trademark Office*